Figure 8:
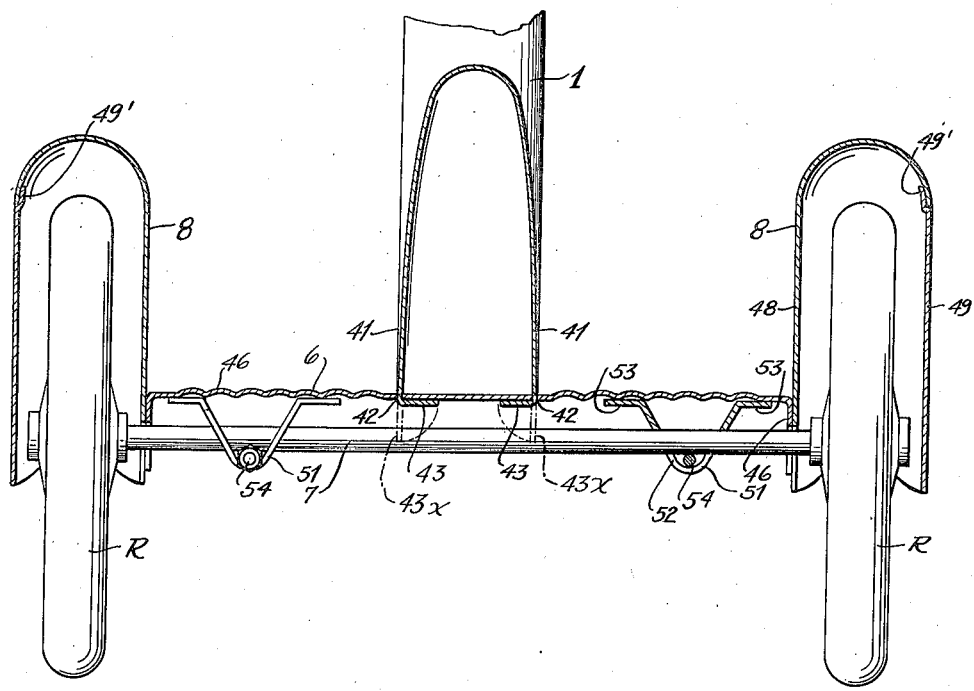

Jan. 19, 1937.    H. L. KRAEFT    2,068,125
JUVENILE VEHICLE
Filed Feb. 19, 1935    4 Sheets-Sheet 1
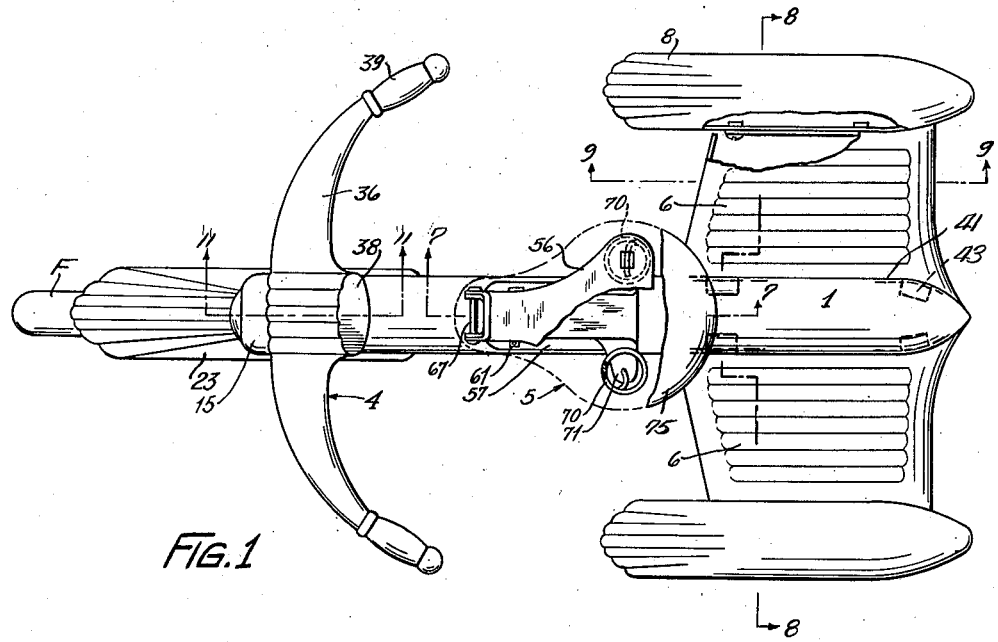
FIG.1
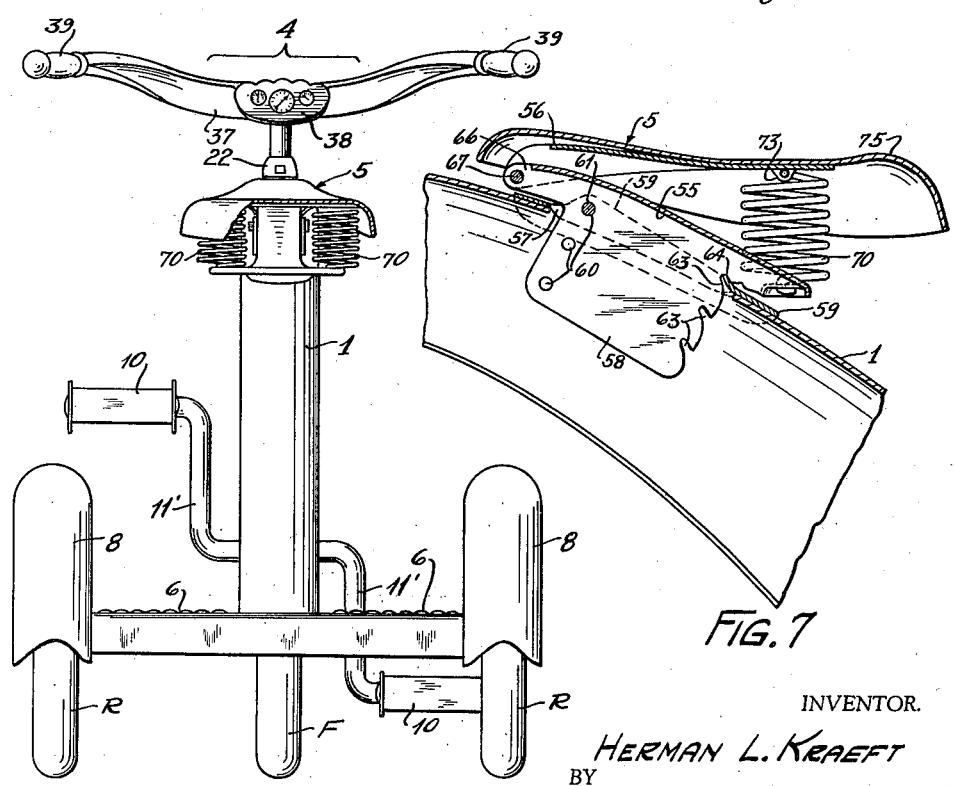
FIG.2
FIG.7
INVENTOR.
HERMAN L. KRAEFT
BY
Bates, Goluck & Teare
ATTORNEYS Jan. 19, 1937. H. L. KRAEFT 2,068,125
JUVENILE VEHICLE
Filed Feb. 19, 1935 4 Sheets-Sheet 2
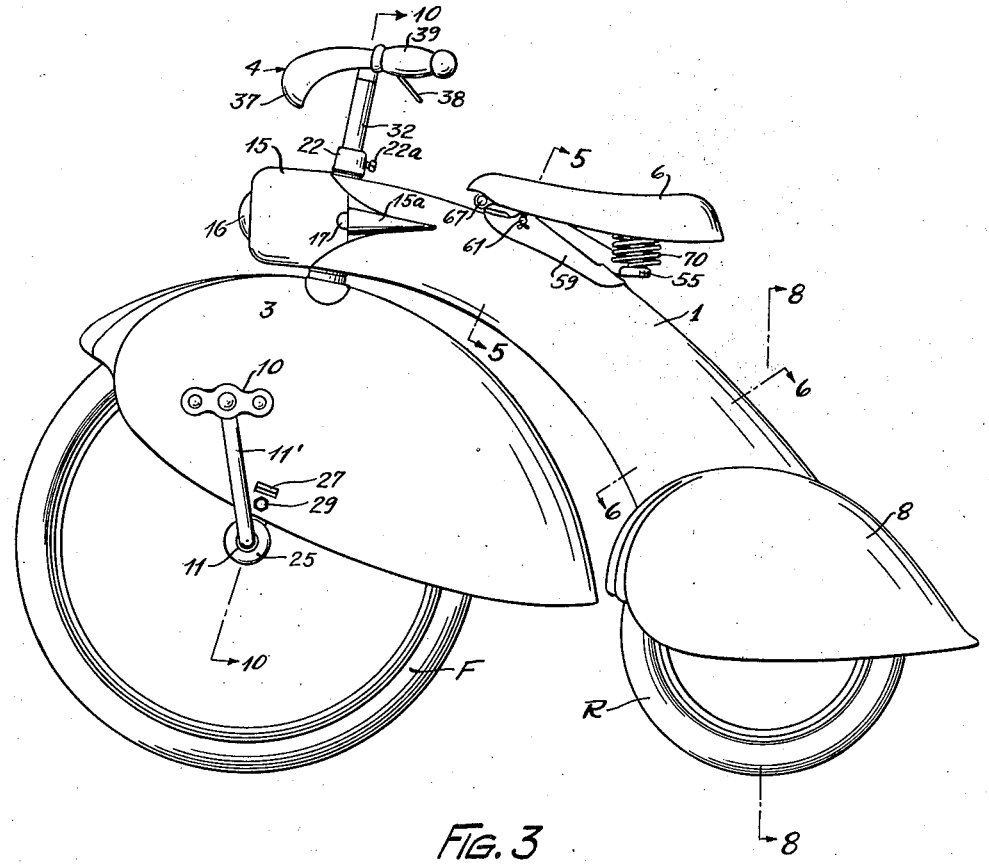
Fig. 3
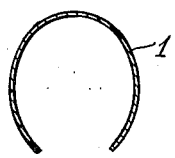
Fig. 4
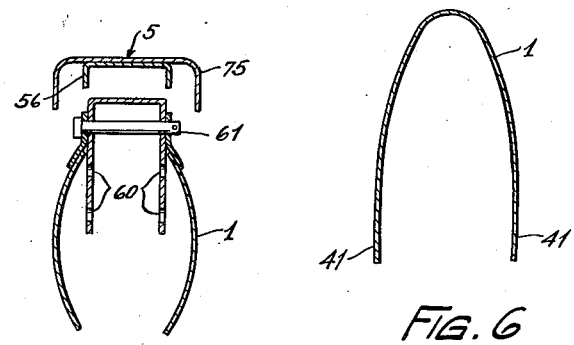
Fig. 5
Fig. 6
INVENTOR.
HERMAN L. KRAEFT
BY
Bates, Golrick & Teare
ATTORNEYS.

Jan. 19, 1937.  H. L. KRAEFT  2,068,125
JUVENILE VEHICLE
Filed Feb. 19, 1935  4 Sheets-Sheet 3

INVENTOR.
HERMAN L. KRAEFT
BY Bates, Goldrick & Teare
ATTORNEYS.

Jan. 19, 1937.  H. L. KRAEFT  2,068,125
JUVENILE VEHICLE
Filed Feb. 19, 1935  4 Sheets-Sheet 4
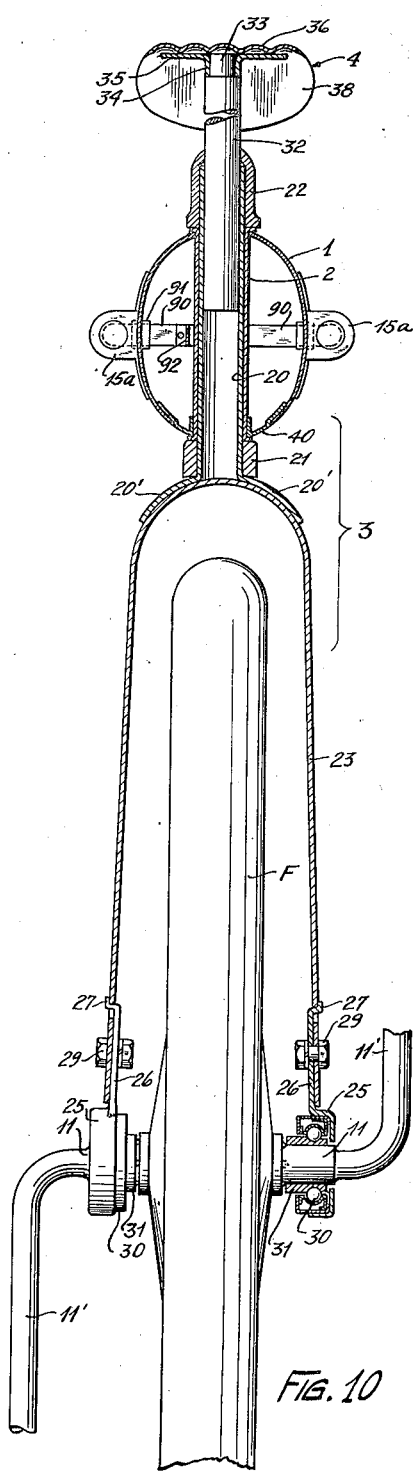
FIG. 10
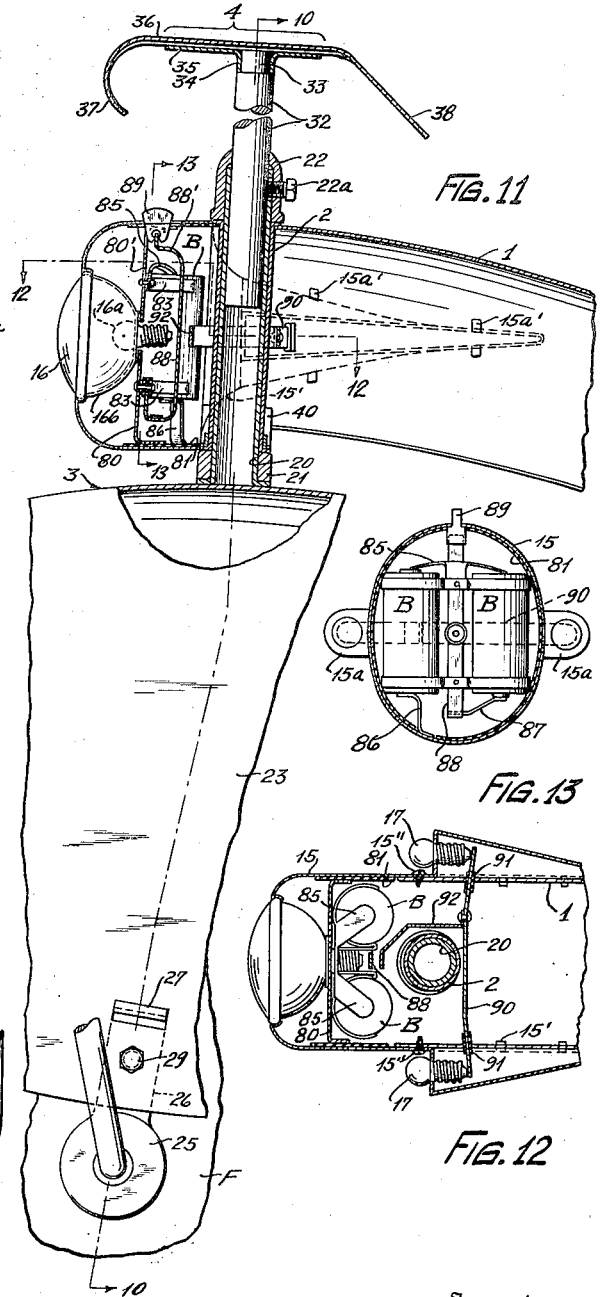
FIG. 11
FIG. 13
FIG. 12
Inventor
HERMAN L. KRAEFT
By Bates, Golrick & Teare
Attorneys Patented Jan. 19, 1937

2,068,125

UNITED STATES PATENT OFFICE 2,068,125

JUVENILE VEHICLE

Herman L. Kraeft, Cleveland Heights, Ohio, assignor to The Murray-Ohio Manufacturing Co., Cleveland, Ohio, a corporation of Ohio Application February 19, 1935, Serial No. 7,171

5 Claims. (Cl. 208—113)

This invention relates to a pedal-driven toy vehicle, particularly to a velocipede of the tricycle type. One object is to provide an improved tricycle frame construction, the essential parts of which may be simply made from die-formed sheet metal, to the general end of decreasing weight and enhancing appearance, while maintaining the necessary strength and rigidity to safely support a child and withstand abuse.

A further object is to provide a velocipede in which all the rotating parts are fully guarded while allowing the child complete flexibility of movement of his arms, legs and body.

A further object is to provide an improved front-wheel steering fork construction, combining both a wheel guard or fender and an adequate axle support for the wheel.

A further object is to provide an improved saddle construction and mounting therefor, combining a more pleasing appearance with proper functioning as a saddle.

The specific object is to provide a saddle construction, capable of being made practically entirely from a few, inexpensive, sheet-metal parts, so arranged as to allow the necessary adjustments to fit the requirements and/or whims of the child and which, both in appearance and in fact, will constitute a more unitary part of the vehicle frame.

Another specific object is to provide an adjustable saddle construction, by which a large variety of adjustments may be effected by the child himself,—that is to say, without requiring adult assistance.

Still another object is to provide an improved handle-bar construction and arrangement adapted to be conveniently made largely from sheet-metal stampings, and which will be strong, pleasing in appearance and light in weight.

Another object is to provide an improved lighting unit for a velocipede or child's cycle, which unit shall include a battery and light bulb housing and convenient switch.

Another object is the provision of an improved axle mounting for paired wheels of a toy vehicle, such as herein shown.

Further objects and features of the invention will become apparent from the following description, relating to the accompanying drawings, showing the preferred form. The essential novel characteristics are summarized in the claims.

Figure 9:
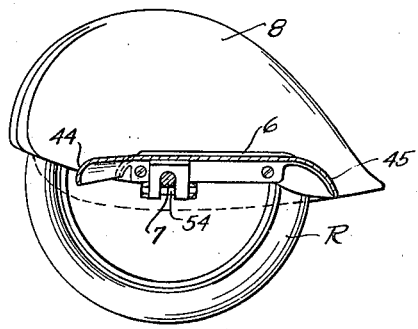

Referring briefly to the drawings, Fig. 1 is a plan view of one embodiment of the invention partly broken away to show certain details of the construction; Fig. 2 is a rear elevation of the embodiment shown in Fig. 1; Fig. 3 is a side elevation showing the same arrangement; Figs. 4 to 6 inclusive are sectional views, indicating by corresponding section-indicating lines on Fig. 3; Fig. 5 shows particularly the saddle supporting construction; Fig. 7 is another view of the saddle construction taken as indicated on Fig. 1; Figs. 8 and 9 are transverse and longitudinal sectional views, as indicated by the lines 8—8 and 9—9 on Fig. 1 of the rear main frame and axle-supporting construction; Fig. 10 is a transverse sectional view, as indicated by the line 10—10 on Fig. 3, showing the front fork, support therefor and handle-bar construction; Fig. 11 is a longitudinal fragmentary central sectional view taken at right angles to Fig. 10, as indicated on Fig. 1; and Figs. 12 and 13 are detail sectional views taken substantially as indicated by the lines 12—12 and 13—13 on Fig. 11, the plane of Fig. 13 being also indicated on Fig. 12.

In the various figures, the principal elements of the structure are as follows:

The main velocipede frame includes a hollow sheet-metal back-bone member 1, having an upright tubular steering fork support 2 for the fork 3 of the front wheel F. The handle bar assembly is shown at 4. The back-bone carries a saddle assembly 5 in the usual position and the rear end of the back-bone terminates at and is rigidly secured to a transverse platform member 6, which forms a substantially rigid rear cross-beam for the frame adapted to support the axle 7 for the rear wheels R. The platform also preferably supports, rigidly therewith, fenders 8 for the rear wheels. Preferably the front wheel is arranged to be directly driven by a suitable pair of pedals 10 on crank arms 11', forming part of the front wheel axle 11 in suitable fashion.

A head light assembly in a suitable casing 15 is secured to the steering post supporting portion of the main frame, and may comprise a central headlight 16 and side "parking" lights, two being shown at 17, with a suitable common control, as will be later more fully described.

Referring now to the fork and steering post construction, Figs. 10 and 11 show a hollow steering post or tube 20, turnably secured in the sleeve 2, the post having a ring 21 abutting the lower end of the sleeve 2 and a suitable ring 22 above the sleeve, the upper ring being suitably secured rigidly to the steering post assembly as by a set screw 22a, thereby, in cooperation with the ring 21, axially holding the steering fork assembly in position. The screw is threaded into the ring 22, passes through an opening in the tube 20 and the end tightly engages a solid post member 32 telescopingly engaging the tube 20, which post extends upwardly from the tube to support the handle bar assembly, of which the post member 32 is a part, as will later be shown. The lower end of the tube 20 has outwardly flanged portions 20' which embrace the upper curved surface of a sheet metal fender or wheel guard member 23 of the front fork assembly, to which the flanges 20' are secured, as by welding.

The axle 11 for the front wheel may be supported directly by a portion of the fender member 23, but preferably, to facilitate assembly, there are separate bearing supporting brackets 25 carried near the lower edges of the side portions of the fender member, these being shown as having attaching portions 26 engaging the inside surfaces of the respective fender sides in face to face relationship therewith and having outwardly offset end portions 27 passing through elongated slots 28 in the fender member 23 and into hooked engagement with the outer surfaces of the fender to fully lock one end of the bracket in place, as clearly shown in Figs. 10 and 11. Thus a single bolt and nut assembly 29 is sufficient to complete the attachment of each bracket, the bolt passing through aligned openings in the bracket 25 and the fender, and being provided with suitable locking means,—a lock washer e. g. The lower ends of the brackets 25 are cupped to receive and rigidly support anti-friction bearing assemblies 30, which in turn, by means of suitable inner bearing ring elements 31, support the axle 11.

The solid steering post member 32 previously mentioned may have a reduced end portion 33, which is telescoped by a tubular portion of a bracket 34 of suitable gage sheet metal, the bracket having a laterally extending flange 35. The bracket is rigidly secured to the post as by arc welding. The main handle bar member 36 is also sheet metal and the central web portion thereof is welded to the flange 35, as by spot welding. This member 36 has a forwardly disposed downwardly curved flange portion 37 and this, as well as the central web, may be suitably fluted for decorative purposes and also to lend longitudinal stiffness to the assembly at the portion subjected to greatest strain in steering the vehicle. At the rear end of the central web portion the metal of the handle bar member extends diagonally downwardly as at 38 and is suitably shaped to simulate an instrument board, as shown particularly in Fig. 2, which may be suitably decorated with simulations of various indicator dials, etc. The arm portions of the handle bar member 36 are continuations of both the forwardly disposed curved flange and the central web and the arms curve upwardly and rearwardly, decreasing in cross-section toward the ends which are tubular and have suitably fitted thereto hand grip elements 39, say moulded rubber tubes slipped over the tubularly formed ends of the handle bars.

Referring now to the back-bone structure, the back-bone 1 comprises a generally tubular sheet metal member, the forward end of which is generally elliptical, closed at the top and sides and nearly closed at the bottom, as shown in Figs. 4, 10 and 11. The tubular back-bone may, if made as aforesaid, be supplemented by a metal cross-strap 40, (see Figs. 10 and 11) which joins the inwardly extending and spaced lower marginal portions of the sheet metal, being welded thereto, e. g., which strap supports the lower end of the sleeve 2. Comparing Figs. 3 and 5, it will be noted that in the region of the saddle 5, the member 1 increases in vertical dimensions being, however, about the same in width, and the lower edges of the sheet metal are spaced about as in Fig. 4. Further toward the rear, the section becomes still deeper, as shown in Fig. 6, wherein the section approaches a parabola in shape, having no inwardly curved marginal portions. As shown in Figs. 1 and 8, the ends of the spaced side wall portions 41 of the back-bone where the same joins the platform 6 have, initially, downwardly extending parallel tongues or lugs, as shown in broken lines at 43x, which enter suitable slots 42 in the top wall of the platform 6. The tongues are bent over, preferably inwardly, against the underside of the platform as at 43 and are secured rigidly thereto, as by spot-welding.

The above manner of securing the back-bone to the platform member 6 has the advantage of being very simple as an assembly operation, and if the parts are welded together one terminal of the welding apparatus may be easily inserted through the open front side of the back-bone into welding position with relation to both inwardly bent lugs 43, the other terminal, of course, being easily applicable to the lugs from the underside of the platform prior to securing the axle to the platform.

As shown in Fig. 9, the platform 6 has downwardly curved flanges extending entirely along both the front and rear thereof, as at 44 and 45, to stiffen the same and improve the appearance and the intermediate horizontal wall portion of the platform 6 may be further stiffened and enhanced in appearance by the provision of longitudinal ribs at 46, see Fig. 1. These ribs may be so formed as to provide a non-skid surface for the child's feet. The ends of the platform member are bent downwardly, forming flanges as at 46, Figs. 8 and 9, and the fender members 8 may be detachably secured to the flanges as by suitable bolts 47.

The fenders 8 may comprise single piece sheet metal members or two or more parts may be used to form each fender, as shown at 48 and 49. The part 49, forming the outer wall of the fender, may be welded to the part 48 as at 49'. The two part (e. g.) arrangement saves the expense of deep drawing dies and reduces the percentage of defective stampings in quantity production.

The axle 7 may be of generally conventional form, likewise the wheel bearings (not shown) at the ends of the axle for the rear wheels R. The axle as shown comprises simply a section of round bar stock. Adjacent the wheels, the end portions of the axles may engage suitable circular recesses at the lower edges of the flanges 46 as a partial support and similar recesses aligned therewith in the members 48 of the fenders. The main support for the axle comprises clamp-brackets, preferably sheet-metal, indicated at 50. These, as shown in Figs. 8 and 9, have slotted V-shaped portions 51 with slots 52 to receive and embrace the axle and flanges 53, by which the brackets may be secured, as by spot welding, to the underside of the platform 6. Suitable clamping bolts with appropriately locked nuts pass between the apex of the V-formations and the axle so that the opposite side walls of the slots may be clamped against the axle to hold it rigidly in place, while permitting the axle with the wheels thereon to comprise a convenient sub-assembly and also permitting the axle to be easily taken out, if bent in use, e. g., without having to remove the wheels.

Referring now to the saddle structure, particularly Figs. 1 to 3, 5 and 7, the saddle support comprises principally two sheet metal parts, 55 and 56, the part 55 being adjustably secured in an elongated opening 57 in the top wall of the back-bone member 1 and the part 56 being pivotally secured to the part 55 and yieldingly supported thereon by suitable springs, to be presently described.

The saddle supporting part 55 comprises a generally U-shaped section of sheet metal, having spaced parallel side plate members 58 adapted to enter the opening 57 between parallel upstanding ears of a bracket 59. The ears may comprise part of the back-bone or a separate bracket or pair of brackets may be welded or suitably secured to the back-bone. Preferably, a single bracket member separate from the back-bone is provided, it being desirable that the bracket be of heavier stock than that of the back-bone. The side plate members 58 have a series of aligned apertures at 60 for selectively receiving an attaching bolt assembly 61 by which the forward ends of the plate members are detachably coupled with the upstanding ears of the bracket. The rearward ends of the side plates 58 have deep notches 63 selectively engageable by a tongue portion 64 of the bracket 59. The opening 57 and the coextensive opening in the bracket 59 are of sufficient longitudinal extent so that when the bolt 61 is removed, the side plates may be slid forwardly sufficiently to withdraw the tongue 64 from the notch 63 engaged thereby so that the tongue may be re-engaged with other notches and the seat raised or lowered as desired.

It is obvious from the drawings that the saddle assembly may be tilted fore and aft, say by having the bolt 61 pass through the intermediate pair of bolt holes 60, and having the tongue 64 occupy one or the other of the extreme notches 63. Other tilted positions may be had, as will be obvious.

Above the back-bone, the member 55 is extended forwardly as at 66 and the extension has aligned apertures adapted to receive a pivot bolt or pin 67 connecting the saddle member 56 with the member 55 so that the rear portions of the upper saddle member are free to move up and down with relation to the member 55. The member 56 is also U-shaped in cross-section, (see Fig. 5) the downwardly extending flanges straddling the extension 66 both to slidably guide the saddle in its vertical movement and for the provision of the pivot connection at 67. It will be noted in Figs. 1, 2 and 7, that both members 55 and 56 have laterally extending ear or wing formations, forming spring seats or mountings for coil springs 70. As shown, the member 55 has spring seat ears at 71 apertured to receive the hooked lower ends of the respective springs,—see Fig. 1—and the member 56 has superposed laterally extending ears at 72, with down-struck shackle loops at 73, for the laterally bent upper ends of the springs 70. The saddle member 56 may be amplified, as required to form the saddle seat surface, or may have secured thereto in any suitable fashion a cover or seat proper say of sheet-metal, leather, relatively stiff composition or like or suitable material; such separate seat being indicated at 75. Attention is particularly called to the fact that the seat portion of the saddle lies very close to the back-bone as compared to the conventional saddle arrangement (post type), and that the various desired adjustments can be effected by the child himself, due to the simplicity of operations necessary to effect adjustment. The structure moreover is more sturdy and the necessary flexibility is had between the two main elements of the saddle mounting, so that the child's body is yieldingly supported over the cycle frame in any position of adjustment of the saddle.

Referring again to the head light and "parking" light devices, shown in detail in Figs. 10 to 13, inclusive, the casing shell 15 is in the nature of a cup, the bottom of which has a central opening supporting a conventional reflector, bulb and lens assembly forming the headlight 16 (bulb at 16a having the usual "ground" contact with the reflector 16b). The rim of the shell telescopingly fits the open front end of the frame member 1, as a convenient support, and the horizontally opposite rim portions 15' of the shell are extended as shown in Figs. 3 and 12 to substantially abut the front end portions of side casings or brackets 15a for the "parking" lights 17. The rim portions 15' are shaped to merge with the upper and lower edges of the brackets 15a, for appearance, and the said brackets taper rearwardly in "stream line" effect as viewed both in side elevation (Fig. 3) and in plan (not shown, but see Fig. 12). The rim portions 15' of the shell 15 may snap onto the tubular walls of the back-bone in the manner of securing the shell parts of commonly used electric service sockets or screws may be used as at 15", Fig. 12.

The brackets 15a of the "parking" lights are, as shown, held on by lugs 15a',—see Figs. 11 and 12. Reflectors etc., are omitted in the case of the "parking" lights and ground contact is made by each bulb directly by the front walls of the hollow portions (see Fig. 12) of the brackets.

Two important features of the lighting arrangement are that the batteries are replaceably mounted in the main head light casing which is adapted to be detached from the vehicle to render the mountings accessible to change the battery cells or bulb and that a single switch mounted on one light casing selectively controls both systems of lights, i. e. headlight as one system and "parking" lights as another. The mountings, conductors and control switch elements are arranged as follows:

As shown in Figs. 11 and 12, a main battery and contact support 80 is supported in the casing 15, this support being of hard fibre e. g. and cup-shaped to tightly fit the shell 15 or an insulation sleeve 81 therein. The transverse wall 80' of the support has a central opening through which the shank of the bulb 16a extends.

Suitable spring clips 83 are attached to the support 80 on its rear side for supporting batteries B (two being shown) having "pole" portions in electrical contact with spring conductor strips 85, 86 and 87. The batteries are relatively inverted and connected in series by said conductor strips. The strip 85, supported on the member 80—bridges respective positive and negative poles of the batteries. The strip 86 grounds the negative pole of one battery, as shown in Fig. 13, and (same figure) the strip 87 connects the positive pole of the other battery to a switch bar 88 mounted on the support 80, as shown in Fig. 11, and which extends upwardly adjacent the end contact of the bulb 16a against which the switch bar may be swung to close the circuit through the bulb. The upper end of the bar is bent forwardly at 88' (for spring effect) and then upwardly, and the extremity carries a thumb piece 89 of suitable composition extending out of the casing 15 through a suitable slot in its upper wall. As shown in Fig. 13, the thumb piece is shouldered to engage the underside of the upper casing wall adjacent the slot as a frictional detent so that the bar will stay in whatever position relative to the slot the child moves it. The spring effect at 88' (also at the parallel lower portion of the bar) maintains the frictional contact. The circuit established by a forward movement of the switch is obvious from the above description.

The "parking" light bulbs 17 which are grounded to the brackets 15a at their threaded shanks are electrically connected to one side of the battery system through the telescoping fit between the frame member 1 and the casing 15 and through the battery ground connection at 86 (Fig. 13). To complete the circuit to the bulbs 17, a common horizontal metal contact bar 90 is mounted in insulating sleeves 91 in suitable slots in the side walls of the back-bone member, as shown particularly in Fig. 12, the ends of the bar being adapted to make continuous yielding contact with respective bulbs 17. The intermediate portion of the bar 90 has secured thereto a metal arm member 92, which reaches forwardly around the sleeve 2, as shown in Figs. 11 and 12, so as to be engaged by and make electrical contact with the switch bar 88 when moved rearwardly from the position shown in these figures. It will be seen that such rearward movement of the switch bar 88 makes the necessary positive pole electric connection with the battery system to turn on the "parking" lights, since the switch bar itself is electrically connected to the system as above described and as shown. In addition to the features of the lighting system above mentioned, it is to be noted that there are no wires or binding post connections such as are usually employed. The battery system and switch is operatively associated electrically with the parking light system merely by the act of properly placing the casing 15 on the vehicle frame. The same arrangement may be used for tail lights (not illustrated) the arm 92 or counterpart thereof being the only necessary element to connect with a suitable conductor or wire running through or along the back-bone to the tail light or lights, assuming such are grounded say in the manner of the "parking" lights herein shown.

I claim:

1. In a velocipede, a sheet-metal cross-beam for supporting a pair of rear wheels, a front wheel support assembly, a hollow sheet metal back-bone extending rearwardly from said assembly and downwardly to join said cross-beam, the lower end of the back-bone member having tongues, and the beam having openings receiving the tongues, said tongues being bent toward each other into underlying face-to-face relationship with the under surface of the beam and being welded thereto, a wall portion of the back-bone being open adjacent the cross-beam for reception of a welding instrument applicable over the beam at the region or regions of the welding.

2. In a velocipede, front and rear wheel assemblies, a back-bone connecting said assemblies, said back-bone having a downwardly extending rear portion, a laterally extending sheet-metal platform, said platform being rigidly connected with the lower end of the back-bone to support the same, an axle for the rear wheels extending beneath the platform, wheels carried on the axle beyond the ends of the platform, and means carried by the platform having downwardly directed open slots detachably receiving the axle for bodily removal and replacement of the axle with the wheels in place thereon, and cooperating means to retain the axle in the slots.

3. In a velocipede a main frame, comprising a back-bone and a metal cross-beam secured rigidly to the back-bone at the rear end thereof, an axle extending beneath the platform and having wheels on its end portions, sheet-metal brackets each having spaced aligned arms secured to the underside of the beam and having a depending connecting portion provided with a downwardly open slot for embracing the axle, there being an axle retaining pin passing transversely of the axle therebelow, lying in the slot and carried by the connecting portion of the bracket.

4. In a velocipede, a metal back-bone and a metal platform rigid therewith at its rear end, an axle extending transversely of the back-bone and beneath the platform, brackets for supporting the axle, each bracket comprising a strip of sheet metal having spaced arm portions secured in face to face relationship with the platform above the axle and extending parallel with the axle and having a depending connecting loop which is slotted in the transverse vertical plane of the axle so as to detachably receive the axle from below and embrace it, there being retaining bolts for each bracket lying in the lower portions of the loops and cooperating means to clamp the side surfaces of the slots against the axle.

5. In a velocipede, a sheet-metal cross-beam for supporting the rear wheels, a front wheel fork support, a hollow sheet-metal back-bone member connecting the cross-beam with the fork support, the rearward end of the back-bone extending downwardly toward the cross-beam and having spaced side wall portions and a rear wall portion which extends from side wall to side wall and forms a closed back, the front of the back-bone adjacent the cross beam being open, said side wall portions having terminal flanges integral therewith and extending toward each other, said flanges being in face-to-face relationship to the cross-beam on its underside and rigidly secured thereto, the open front of the back-bone providing access to between the side portions above the cross-beams whereby securing of the flanges is facilitated.

HERMAN L. KRAEFT.